INVENTOR.
EDWARD CAMP DOWLING
RAYMOND MELVIN CARLISLE
JAMES ALEXANDER FRAUNFELDER
BY Curtis, Morris & Safford INVENTOR.
EDWARD CAMP DOWLING
RAYMOND MELVIN CARLISLE
JAMES ALEXANDER FRAUNFELDER
BY Curtis, Morris + Safford

United States Patent Office 3,446,982
Patented May 27, 1969

3,446,982
SIGNAL SWITCHING CIRCUIT

Edward Camp Dowling, Harrisburg, Raymond Melvin Carlisle, Linglestown, and James Alexander Fraunfelder, North Wales, Pa., assignors to AMP Incorporated, Harrisburg, Pa.

Filed Mar. 24, 1966, Ser. No. 537,090
Int. Cl. H02j *1/10*
U.S. Cl. 307—29 10 Claims

ABSTRACT OF THE DISCLOSURE

A signal switching circuit is disclosed which features a series of switches selectively operable to connect a given input signal to an output lead responsive to the operation of a control element connected to drive each switch. The various control elements are connected so that the selective operation of a given control element automatically and instantly clears all other control elements to instantly terminate drive to any previously selected switch. An energy storage circuit is provided for each switch which maintains the switch in closure after its associated control element has been cleared, so as to provide a controlled overlap of signal sources connected to the output lead. The connection between a control element and a switch includes an impedance which steers initial driving current to the switch coils and prevents the storage circuit from detracting from the rate of switch closure. Memory cores are used for the control elements to provide high switching speeds and switching program retention in the event of power failure.

*Background of the invention*

Figure 1:
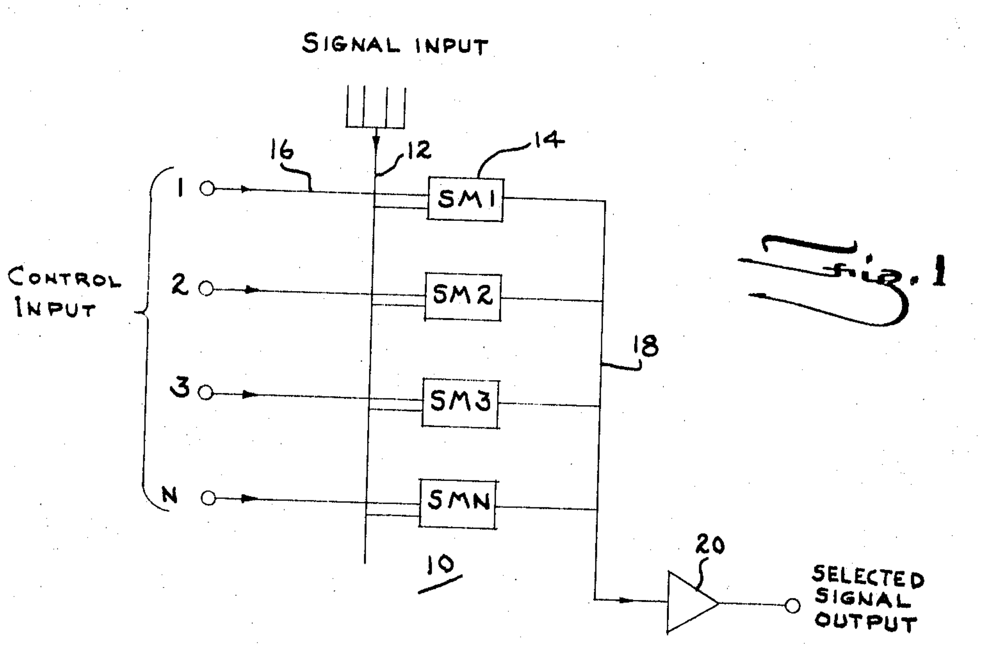

The technical requirements for switching signal paths are very substantially increased if synchronization is required and, particularly, if switching effects are objectionable in an output path. An example of this is in radio and television systems wherein switching effects are audibly or visually perceptible. When there is a change from one signal source to another signal source, as occurs for example in television switching during commercials, several things may happen. First, if the ON line source is terminated prematurely by opening its associated switch too soon, a gap in signal will result. Many present signal switchers employ gap switching and attempt to minimize the attendant visual and audible disturbance by switching rapidly and compensating for volume changes. A second approach is to simultaneously operate source switches. This is extremely difficult to accomplish. Moreover, it does not satisfactorily eliminate disturbance, because with all known switches there is some bounce on switch closure. This means that at the same instant the ON line source goes OFF the output will experience a series of gaps until the replacement source switch passes the transitory period of bounce. As one result of this the prior art has gone to switches and control circuits of considerable complexity and cost.

A third alternative is one of overlap switching where the line source is left ON for a period of time after initiation of the next signal source switch. This approach requires considerable care to avoid effects created by mixing sources which, if allowed to persist, will be more disturbing than that resulting from gap switching. The foregoing problems are considerably aggravated if switching control is manually implemented.

Additional considerations which must be dealt with in switching systems for signals of appreciable frequency include impedance matching, switching noise and signal distortion and interface compatibility with various program systems.

*Summary of the invention*

This invention relates to a circuit for selectively switching signal paths.

It is accordingly an object of the present invention to provide a circuit for switching signals by means which minimize audible and visual disturbance caused by source changes and at the same time provide a low loss signal path which is substantially free of switch noise.

It is a further object to provide means for selecting one of many signal sources and connecting such to an output channel automatically with an overlap of sources controlled to reduce perceptible signal disturbance.

It is still another object to provide a switch circuit which assures a desirable mixture of signal sources to prevent audible or visual gapping and other undesirable switch effects.

A further object is to provide overlap switching in a circuit which is simple, reliable and of low cost.

A still further object is to provide a switching matrix for signals of appreciable frequency which is capable of being initiated and maintained by control signals of a type which may be developed from a variety of manual and electronic sources.

Another object is to provide a switching system wherein control data for effecting program changes is stored in means capable of preserving program instructions in the event of power failure.

The present invention attains the foregoing objectives through a series of switches which are impedance matched to each other and to signal source paths and through a circuit which provides an overlap of connection of signal sources controlled in time to produce a desirable transition in an output signal. The invention circuit is arranged so that any one of many signal sources may be selectively connected into an output path by control pulses generated in a circuit isolated from the signal paths. This circuit functions by first closing a selected switch to connect a signal source into the output and then disconnecting the source ON line after a delay sufficient to eliminate the effects of switch bounce in the closed switch. This results in a continuation of output signal extending fully through the transition between signal selection and switching. Means are provided to hold the signal level substantially constant at the level of a single signal input in the presence of two signal inputs during the transition time.

The control circuit of the invention is in a preferred embodiment implemented through magnetic cores arranged in a circuit so that control can be initiated manually if desired. Control may also be initiated from stored data as by core memory, tape or punched cards. With the invention circuit, changes in programming of signal sources can be readily and easily implemented and the control program will survive power failure.

In the drawings:

FIGURE 1 is a block diagram showing a switch matrix for selectively connecting one of many signal input paths to a single output path.

Figures 2A, 2B, 2C, 2D, 2E:
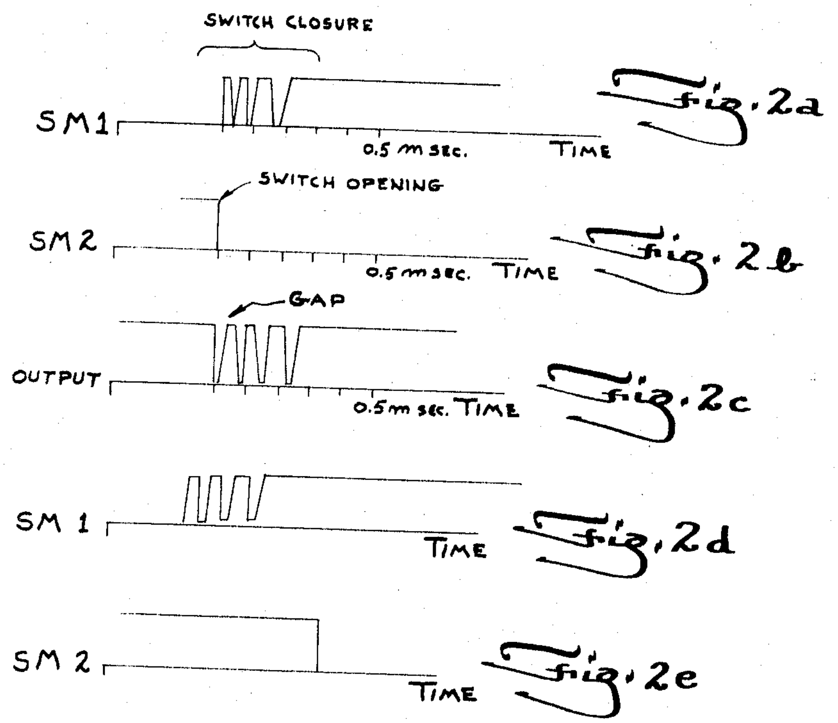
Figure 2F:
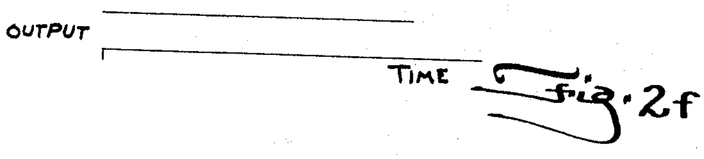
Figure 3:
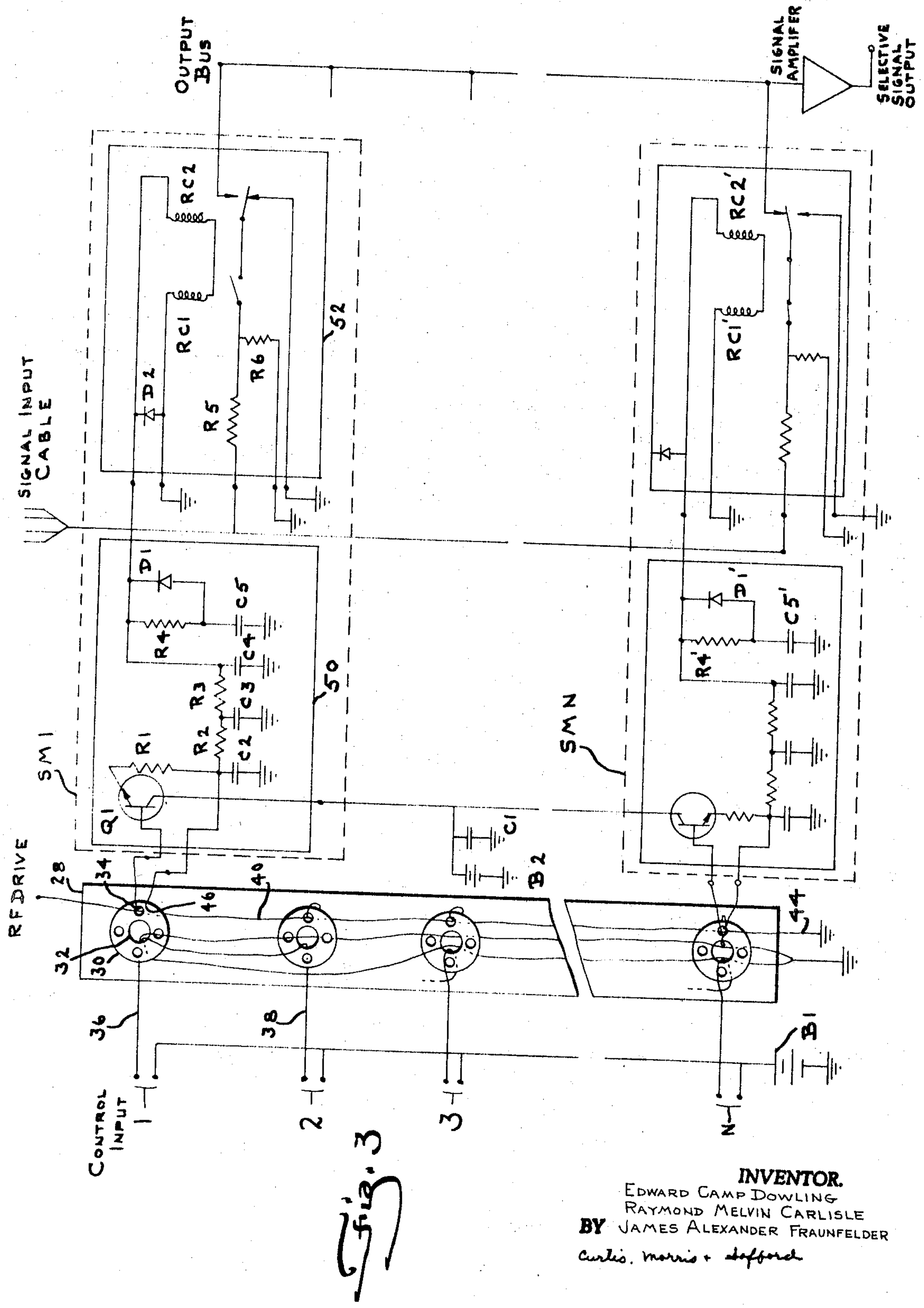

FIGURES 2*a*–2*f* are time voltage plots showing switching characteristics to explain the operation of the invention to provide overlap and eliminate signal gaps; and FIGURE 3 is a schematic diagram showing a preferred embodiment of the invention circuit in detail and integrated into a switching matrix.

*Description of preferred embodiment*

Referring now to FIGURE 1, there is shown a switching matrix 10 adapted to selectively connect any one of a number of signal inputs to a single output path. Each of the signal inputs is connected to one of the switch modules SM1 through SMN, each of which has an output connected to a bus leading to an amplifier and the output path of the matrix. There is an individual control signal input for each switch module operable to close the module switch contacts when energized and hold such closed as long as the control signal input is maintained. During normal operation one of the modules is always energized and closed and the others are not energized and open. The problems heretofore discussed arise during switch operation to selectively change signal inputs; i.e. to open the contacts of one module and close the contacts of another module.

To reference the invention to a specific application, the signal inputs may be considered as various video and/or audio channels or sources which must be programmed onto an output lead connected to transmission equipment. One signal may represent a given program and the others may represent various commercials, announcements and the like. Frequently, a television station will have as many as twenty available signal sources, half of which may be called for in a relatively short period of time. Since these signals are visually or audibly perceptible the various changes from source to source produce effects which are also perceptible. Indeed all of the phenomena of switch operation, including timing of switch contact closure, opening, bounce and circuit interaction, will be present. Those of certain frequencies will be perceptible and experience has shown that with signals between 500 and 1000 c.p.s. switch operation may definitely be seen and heard.

FIGURE 2*a* shows a plot of a typical and expected switch characteristic for switch closure versus time. The plot evidences the signal output level as it is modulated by contact bounce. This will appear on a television screen as a black line or lines intersecting the picture presented as the transmitted and received video signal is gated ON and OFF by the bounce of switch contacts. With respect to audio signals, it will be heard as a distinct pop or series of pops.

FIGURE 2*b* shows switch contact opening characteristics in terms of signal level versus time. As can be seen, the transition is quite sharp and clear and, of itself, is satisfactory for signal switching. FIGURE 2*c* shows the output signal level versus time which results if control signals are supplied to energize one switch for closure and de-energize a closed switch simultaneously. The first transition represents switch opening as in FIGURE 2*b* and the following waveform represents contact bounce and finally steady signal level output. As will be discerned, there are distinct periods when there is no signal level present in the output path. This means that even though switch operation is made simultaneous, gap switching characteristics still result. This will, of course, be aggravated if switch opening is initiated slightly before switch closure.

In accordance with the invention switch operation is controlled so that the switch associated with the signal sources to be connected to the ON line is closed for a period of time prior to initiating switch opening. FIGURES 2*d* and 2*e* show the timing for this and FIGURE 2*f* shows the resulting output signal level which includes first one signal, then a period of overlap and then another signal. Signal level is essentially constant throughout the period of closure and opening. No gapping occurs. By means to be described the signal levels are reduced when commoned to prevent an increase in signal amplitude.

While the foregoing may appear to solve the problem of switching operation heretofore discussed, it is still necessary to carefully control and limit the timing of switch operation. If the delay is too short it will not carry fully through the transition and bounce time of the closing contacts and some gapping will result. If the period of overlap is too long the blended signal will produce perceptible disturbance. With respect to video switching overlap times of more than 1.0 millisecond are objectable. With respect to audio overlap, times which produce signal components of more than 500 c.p.s. can be heard. The minimum period of delay is related to the characteristic of the particular switch being employed, some switches having more contact bounce than others. In general, for applications of the type contemplated, only switches having minimum bounce are used and for low voltage applications such as in video and audio switch systems reed switches are preferred. For the typical reed switch bounce time is about 0.25 millisecond and minimum overlap should be about 0.5 millisecond to provide a factor for variations.

Referring again to FIGURE 1 it will be apparent that the invention contemplates circuit operation wherein regardless of when control signals are initiated the timing of control signal application must be such that the various switch modules are driven to close and open paths supplying the signal samples in a rather exact and timed sequence to provide the particular overlap operation required by the application involved. From this if SM1 is connected on line and it is desired to connect SMN, then the contacts of SMN must be closed and after a delay the contacts of SM1 opened. If the switch modules are self opening relays this means that the control signal for SMN must be first applied and then the control signal of SM1 cut off. Or alternatively, if latching relays are used some selected control signal must be applied to SM1 to drive it open, all in the proper sequence. Both cases, of course, require some means not shown to develop the control signals and the timing of signal application.

In accordance with a preferred embodiment of the invention the switch modules SM1–SMN are made to include, in addition to relays, structure means to delay opening by a fixed period of time. This means that simultaneous application or cessation of the related pair of control signals may be accomplished with overlap being provided through the switch module. This eliminates that peripheral equipment which would be necessary to develop control signal timing. It also assures proper overlap for manually initiated programming changes which normally have to be carefully synchronized by an experienced operator.

As an additional preferred embodiment the invention circuit includes a storage interface between control and the related switch module which is capable of maintaining a given program selection in the absence of power, as during circuit intermittents or actual power failure.

FIGURE 3 shows the invention embodiment which includes these features and details the switch module heretofore discussed. The circuit is generally similar to that of FIGURE 1 and is operable to provide the overlap and signal output characteristic shown in FIGURE 2*f*.

Referring generally to FIGURE 3, the signal input leads, output bus and lead, control inputs and switch matrix are arranged to function as previously described to connect and disconnect selected signal paths to provide an output signal. The control circuit includes pushbuttons associated with 103 and in control paths to exemplify a means for initiating control. The pushbuttons could, of course, be other types of switches, electrochemical, solid state or could be replaced by a transducer set up to respond to stored data, as from a core, tape or punched card. With the circuit of FIGURE 3 as distinguished from the generalized circuit of FIGURE 1, a single control pushbutton is made to effect a connection of the selected switch and a disconnection of the switch ON line. This is achieved through the use of switch modules SM1–SMN which automatically provide a delay after initiation for opening.

Associated with all control inputs in a core array 28 having a magnetic core 30 for each control input. Each magnetic core 30 has at least one major aperture 32 and at least one minor aperture 34, and is of squareloop material capable of being set or cleared in stable states defined by sense of flux disposition or magnetic remanence.

Each core includes an input winding such as 36 and 38 shown passing through the cores associated with control inputs 1 and 2. These input windings are in a sense to set the cores responsive to a current pulse from a battery B1 developed when the related pushbutton is temporarily closed. The set condition employed is controlled so that about half of the flux of the core is switched in a counter-clockwise sense leaving about half in a clockwise sense. The set winding for a given control input is connected to clear all of the other cores of the array. This is accomplished by winding 36, which is connected to a lead 40 which passes through the cores associated with the remaining control inputs in a clearing sense so that the pulse developed by the pushbutton for control input 1 which sets the associated core also clears the other cores. In the same manner the winding 38, which sets the core of control input 2 also is connected to a lead passing through the core of control input 1 and the other inputs to clear those cores.

Each of the core minor apertures is threaded by a driver winding 44 which is continuously supplied by an RF signal. This drive signal is limited in amplitude to prevent it from switching the inelastic or remanant flux of the core material about the major aperture under any conditions. It is made sufficient to switch the inelastic flux of the material about the minor aperture when the core is set and has a related reduced threshold, but not sufficient to switch inelastic flux when the core is cleared to have a higher threshold. The frequency of the RF signal is such as to provide a net flux switched per unit of time to yield an output voltage sufficient to energize relay coils developed in an output winding such as 46 threaded through the output minor aperture 34.

Preferred core drive and output circuits are disclosed in copending applications Serial No. 249,465 filed January 4, 1963, now U.S. Patent No. 3,344,413, and Serial No. 249,466 filed January 4, 1963, now U.S. Patent No. 3,328,784, both in the name of J. C. Mallinson et al.

With the foregoing circuit, depression of a given pushbutton will set the associated core and at the same time clear all other cores. This will produce a voltage output from the selected and set core and cause a cessation of the voltage output from the previously set and selected core associated with the signal ON line. If for some reason an intermittent condition or power failure occurs, the selected program stored in the cores will not be lost and the signal selected will be restored on power resumption whether or not self opening relays are employed in the switch modules.

Auxiliary functions can be carried out by employing additional output windings on the cores of the core array or by employing additional cores supplied by the same input in parallel. For this reason the cores employed have additional minor apertures. One example of this use is where one switch module is used for one video signal source and a second module is used for the audio signal source associated with such. The audio modules would be in addition to the modules shown and would be operated simultaneously therewith.

Turning now to the switch modules shown in FIGURE 3, each module includes a gate and delay circuit and a switch unit such as 50 and 52 in SM1. The modules are substantially identical to each other. The circuit 50 is connected to be driven by the output of the core associated with control input 1 and to be supplied by a source such as B2 which is common to all modules. The capacitor C1 across the supply lead is for noise suppression. The B2 supply is connected to the collector of an npn transistor Q1, which has its base connected to one lead of the core output winding 46 and its emitter connected to the other lead through a resistor R1, which is of a value to hold Q1 off in the absence of core output voltage. In an actual device using a ZN270 transistor R1 is made about 18 so that the input will appear as a high impedance to the core output. The ouput of Q1 operates as an emitter follower and detector of the core output signal.

The output of Q1 is fed through a pi filter comprised of capacitors C2—C2 at R2 and R3, which filter out spokes and RF components which may be developed by the preceding circuit. Next, there is provided a resistor R4 in series with a capacitor C5 in shunt to ground. The resistance value of R4 is made relatively high (10KΩ in an actual circuit) so as to limit and control the charging rate of C5. A diode D1 is used to provide a low impedance discharge path for C4.

The output lead from Q1 then extends to the switch unit 52 and to the coils of relays RC1 and RC2, which are in series and connected to ground. A diode D2 is connected across the coil path to clip voltage spikes therefrom.

As a preferred construction the relays of 52 are reed relays of the general type shown in U.S. Patent 2,506,414. This type of relay has a reduced bounce, long life and can be driven and held by a relatively low current. Furthermore, it has relatively flat contact members which have been found to work well with respect to loss at appreciable signal frequencies.

The relay RC1 is type "A" and includes a single contact which is normally open; i.e., open in the absence of current. Relay RC2 is type "C" which includes a single input lead and a pair of output leads and is normally closed to one of them. The contacts of the relays are in series with the signal input path and the output bus. When a control signal is applied to energize the relay coils the contact of RC1 closes and contact of RC2 opens from the lower path and closes to the output bus path. This converts the signal input to the signal output.

Inserted between the signal input path and the contact of RC1 is a network comprised of resistors R5 and R6; R5 being in series with the switching path and R6 being shunted across the path and ground. These resistors are made to be of close tolerance. This is because when two switch modules are connected in parallel, as during transition time, the resistors of the modules are in parallel to form a bridge circuit. Equal resistance in each path of the bridge effectively balance out circuit flow due to signal differences. As a result an input of some level such as 1 volt for each source is made to produce a 1 volt output signal—no change in level.

The path connected to ground from the lower contact of RC2 is made to be of low impedance and low inductance. It is made of a relatively heavy flat conductive strip for this purpose. The principle reason for using two contacts in series is to provide substantial isolation between signal sources. It has been found that one open contact has a capacity in a series circuit of about 5 picofarads at 10 mc. This provides about 6 decibels isolation. By using two contacts opened between the output bus and each signal path not on line, the isolation is substantially increased. By grounding the contact of RC2 through a low impedance path, the isolation of a module relative to the output bus is increased to more than 60 db.

Considerable care should be taken with regard to construction of each switch, especially with respect to composite position and grounding points. In copending application Ser. No. 537,527, filed Mar. 25, 1966, now U.S. Patent No. 3,331,991 and entitled, Switching Matrix, a preferred construction is disclosed. This application also discloses a preferred construction of the matrix formed by the various switches.

Turning now to operation of the components just described to achieve the function of the circuit, assume that SMN is ON line and that it is desired to cut ON the signal associated with SM1. At that time the core of control input SMN will be set to produce an output holding the transistor of SMN ON and providing current to the associated switch. The relay coils will be energized and the contacts will be, as shown, closed to connect the associated signal input to the output bus and to the signal output terminal. The impedance of the amplifier is made to appear as a high impedance to the signal source so as to limit current flow and effectively respond to the signal as a voltage source. At this time the capacitor C5′ will be fully charged, having been charged by the control input through R4′.

At the instant of signal charge, as by depression of the pushbutton associated with control input 1, the core for each input will be set to cut Q1′ ON and immediately energize RC1′ and RC2′ to drive the contacts from the position shown to the position of the contacts shown in SMN. The resistor R4 will prevent C4 from appearing as a short and will limit the charging of C4 to assure full current level applied to RC1 and RC2.

As the pushbutton is closed, the core associated with input N will be cleared to cut OFF Q1′ in SMN. At this time C4′ will discharge through D1′ to provide a holding current for the relays of SMN and a delay. This delay will be a function of the charge on C5′, the impedance of the discharge path and the value of C5′. In accordance with the invention these values are made to be sufficient to provide an overlap of signals as indicated in FIGURES 2*d*–2*f*. When the current from C5′ is reduced below the holding current level of the relay SMN, the contacts thereof will open to remove the signal source from the line and isolate SMN from the output bus. If the next signal called for is that associated with SMN, a reversal of the foregoing procedure would follow with a controlled delay between closure of the contacts of SMN and opening the contacts of SM1. In similar fashion any of the other switches can be operated to charge signals output from the matrix.

As an additional consideration the use of a core which has a very short switching time relative to that of relays (about 3 microseconds with standard drive pulses) with a high speed relay permits switch operation within the vertical blanking time of television signals (about 1.3 milliseconds). By initiating switching at the proper instant the entire switching operation, including overlap, can be achieved within this blanking time.

Having now disclosed our invention in preferred modes of practice, we define it through the following claims.

What is claimed is:

1. A switching circuit adapted to connect and disconnect signals in the megacycle range of frequencies including an input and an output with a switch circuit connected therebetween, said circuit including a control input comprised of a pulse source linked to a magnetic core to set and clear said core and a core output circuit adapted to produce a continuous output when said core is set and substantially no output when said core is cleared, a circuit path connecting said core output circuit to a relay driving coil, said relay further including contacts of a flat configuration to pass signals in the megacycle range of frequencies with low signal loss and further having a weight and displacement relationship relative to the strength of the said driving coil to provide a fast contact response with minimum contact bounce whereby upon said core being set said relay contacts are driven to fully close within a time period less than twice the time period of said relay.

2. The circuit of claim 1 wherein said circuit path includes a capacitor connected to said core by a winding to be charged by said core output and connected to said relay driving coil to be discharged when said core is cleared to energize said driving coil for a period of time to delay opening of said contacts and said circuit path connecting said core output circuit to the relay driving coil includes a high impedance charging path to said capacitor to maintain maximum driving current to said driving coil for rapid closure of contacts and a low impedance discharge path to facilitate capacitor discharge.

3. In a device for switching signals from an input signal source onto an output path at high switching speed, the improvement comprising a relay having one contact connected to an input signal source and another contact connected to an output path, said relay having a driving coil operable when energized to close said contacts to connect said source to said path within a given closure time, a drive circuit for said relay including a magnetic core linked by windings and a drive circuit operable to switch said core in a given time into set or clear stable states of magnetization, and output circuit linking soid core and connected to drive said coil with an energizing current responsive to said core being set and to maintain said energizing current as long as said core is set, said drive and output circuits including an interconnection and components to set said core and energize said coil to close said contacts in a period of time not significantly greater than the sum of the switching time of said core and the given closure time of said contacts.

4. The device of claim 3 wherein said core is a multi-aperture magnetic core having a major aperture and at least a minor aperture and said output circuit is linked to said core through a minor aperture to provide a non-destructive sampling of the magnetization state of said core.

5. The device of claim 3 wherein the said core has a switching time relative to the said drive circuit therefor which is on the order of several microseconds and the said relay relative to the output circuit linking said core and connected to the relay coil has a switching time substantially less than a millisecond.

6. In a device for switching signals from an input signal source onto an output path at a switching speed less than the vertical blanking time of a television receiver the improvement comprising a relay having one contact connected to an input signal source and another contact connected to an output path, said relay having a driving coil operable when energized to close said contacts in a period of time substantially less than said vertical blanking time, a drive circuit for said relay including a magnetic core linked by a winding and a drive circuit operable to switch said core into set or clear stable states of magnetization in a time substantially less than said vetrical blanking time, a low impedance output circuit linking said core and connected to drive said coil with an energizing current with substantially no delay responsive to said core being set whereby upon said core being set said switching operation occurs at a time less than said vertical blanking time.

7. In a signal switching circuit, signal input means for applying a number of input signals and an output lead adapted to be supplied by a selected input signal, a plurality of switches each including a set of normally open contacts and a coil operable when energized to close said contacts and when not energized to allow said contacts to open, the said contacts of said switches being connected between a given input and said output lead, a control element for each switch having a set state and a clear state and means to produce a control signal output when said control element is set and no output when said control element is cleared, a connection from each control element to a given switch coil applying said control signal output to energize said coil, winding means linking said control elements in a sense to set a selected element and simultaneously clear all other control elements automatically and simultaneously when a given control element is set and means for energizing said winding means to select a given control element, each said switch element including means to delay the de-energization of a switch coil upon cessation of a given control signal output to provide a defined overlap of signals input to said output lead.

8. The circuit of claim 7 wherein the said last mentioned means is a capacitor adapted to be charged by the control signal output and the said connection from each control element to a given switch coil includes an impedance connected to said capacitor having a value sufficient to limit the rate of the charge thereof and thereby preclude the charging of said capacitor from adversely delaying the energization of said switch coil.

9. The circuit of claim 7 wherein each said control element is a magnetic core of saturable material having set and clear conditions of magnetization.

10. In a circuit having at least two signal inputs and one signal output path, a control circuit including at least two control elements each having an on and an off state and means to selectively drive each control element to an on state while simultaneously driving the remaining elements to an off state, a switch connected to each control element and driven thereby when a given control element is in an on state to connect a given input to said output path, means connected to each switch to hold one switch from opening for a controlled period of time after the other switch has been operated to connect the signal input to said output path and each said switch including a circuit path of substantially identical input impedance comprised of one path in series between said input and said output path and one path shunted to ground so that when two switches are operated to connect said inputs to said output path at the same time said paths form a bridge circuit combining said inputs into a composite signal of amplitudes substantially equal to that of the amplitude of individual input signals so as to provide and overlap in signal switching of approximately constant amplitude output.

References Cited

UNITED STATES PATENTS

| | | | |
|---|---|---|---|
| 2,968,749 | 1/1961 | Pearce et al. | 317—148 |
| 3,278,918 | 10/1966 | Smith. | |
| 3,296,499 | 1/1967 | Quinlan | 317—137 X |

ROBERT K. SCHAEFER, *Primary Examiner.*

H. J. HOHAUSER, *Assistant Examiner.*

U.S. Cl. X.R.

307—43, 60; 340—174